(12) United States Patent
Gonzales et al.

(10) Patent No.: US 8,894,083 B2
(45) Date of Patent: *Nov. 25, 2014

(54) BICYCLE AIR SHOCK ASSEMBLIES WITH TUNABLE SUSPENSION PERFORMANCE

(71) Applicants: Jose L. Gonzales, Santa Clarita, CA (US); Gregory Paul Buhl, Pasadena, CA (US); James Colegrove, Lake Mills, WI (US)

(72) Inventors: Jose L. Gonzales, Santa Clarita, CA (US); Gregory Paul Buhl, Pasadena, CA (US); James Colegrove, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,818

(22) Filed: Aug. 20, 2013

(65) Prior Publication Data

US 2013/0334788 A1 Dec. 19, 2013

Related U.S. Application Data

(63) Continuation of application No. 12/704,292, filed on Feb. 11, 2010, now Pat. No. 8,511,448.

(60) Provisional application No. 61/300,182, filed on Feb. 1, 2010.

(51) Int. Cl.
| | |
|---|---|
| *B62K 25/00* | (2006.01) |
| *F16F 9/34* | (2006.01) |
| *B62K 25/08* | (2006.01) |
| *B62K 25/04* | (2006.01) |

(52) U.S. Cl.
CPC ........... *B62K 25/08* (2013.01); *B62K 2025/048* (2013.01); *B62K 25/04* (2013.01)
USPC ....................................... 280/276; 188/266.2

(58) Field of Classification Search
USPC ................. 188/282.6, 319.2, 322.15, 322.22, 188/266.2, 315; 280/275, 276
See application file for complete search history.

(56) References Cited

U.S. PATENT DOCUMENTS 3,706,362 A * 12/1972 Faure .......................... 188/282.8
3,726,368 A *  4/1973 Taylor ............................. 188/316

(Continued)

FOREIGN PATENT DOCUMENTS

| EP | 1687197 B1 | 8/2006 |
|---|---|---|
| EP | 1970593 A1 | 9/2008 |

(Continued)

OTHER PUBLICATIONS

Corrected European Search Report (Application No. EP 11 15 2598) dated Jan. 2, 2013.

(Continued)

*Primary Examiner* — Christopher Schwartz

(57) ABSTRACT

A bicycle air shock absorber assembly that includes a hollow piston rod that is telescopically associated with a hollow compression rod. The piston rod and compression rod are positioned within the casing of the shock assembly. A piston is supported by the piston rod and divides the volume of the compression rod to form a negative air spring chamber and a positive air spring chamber that includes the volume of the piston rod. An optional coil spring is positioned within the casing and contributes in parallel with the positive air spring chamber to resist compression of the shock assembly.

19 Claims, 9 Drawing Sheets

(56) References Cited

U.S. PATENT DOCUMENTS

| | | | |
|---|---|---|---|
| 5,509,675 A | 4/1996 | Barnett | |
| 5,580,075 A | 12/1996 | Turner | |
| 5,634,653 A | 6/1997 | Browning | |
| 5,833,036 A | 11/1998 | Gillespie | |
| 5,878,852 A | 3/1999 | Masamura | |
| 5,988,330 A * | 11/1999 | Morris | 188/322.15 |
| 6,105,988 A | 8/2000 | Turner | |
| 6,135,434 A | 10/2000 | Marking | |
| 6,244,398 B1 | 6/2001 | Girvin | |
| 6,260,832 B1 | 7/2001 | Vignocchi | |
| 6,296,092 B1 | 10/2001 | Marking | |
| 6,311,962 B1 | 11/2001 | Marking | |
| 6,343,807 B1 | 2/2002 | Rathbun | |
| 6,415,895 B2 | 7/2002 | Marking | |
| 6,592,136 B2 | 7/2003 | Becker | |
| 7,000,907 B2 | 2/2006 | Achenbach | |
| 7,128,192 B2 | 10/2006 | Fox | |
| 7,163,222 B2 | 1/2007 | Becker | |
| 7,195,234 B2 | 3/2007 | Jordan | |
| 7,357,232 B2 * | 4/2008 | Fujita | 188/297 |
| 7,900,947 B2 * | 3/2011 | Inoue | 280/276 |
| 8,511,448 B2 * | 8/2013 | Gonzalez et al. | 188/319.2 |
| 2005/0087953 A1 * | 4/2005 | Becker et al. | 280/276 |
| 2007/0057420 A1 | 3/2007 | Jordan | |
| 2007/0262501 A1 | 11/2007 | Cheever | |
| 2008/0035439 A1 | 2/2008 | Fox | |
| 2008/0041678 A1 | 2/2008 | McAndrews | |
| 2008/0041679 A1 | 2/2008 | McAndrews | |
| 2008/0041681 A1 * | 2/2008 | Shipman | 188/319.2 |
| 2008/0116622 A1 | 5/2008 | Fox | |
| 2008/0223673 A1 | 9/2008 | Sawai | |
| 2008/0272570 A1 | 11/2008 | Jordan | |
| 2009/0000885 A1 | 1/2009 | Mcandrews | |
| 2009/0000886 A1 | 1/2009 | Mcandrews | |
| 2009/0000887 A1 | 1/2009 | Mcandrews | |
| 2009/0000888 A1 | 1/2009 | Mcandrews | |
| 2009/0000889 A1 | 1/2009 | Mcandrews | |
| 2009/0001684 A1 * | 1/2009 | McAndrews et al. | 280/276 |
| 2009/0223761 A1 | 9/2009 | Kim | |
| 2009/0236807 A1 | 9/2009 | Wootten | |
| 2009/0277732 A1 | 11/2009 | Trujillo | |
| 2009/0277734 A1 * | 11/2009 | Cox et al. | 188/285 |
| 2009/0277736 A1 | 11/2009 | McAndrews | |
| 2009/0294232 A1 | 12/2009 | Ashiba | |
| 2009/0302558 A1 | 12/2009 | Shirai | |

FOREIGN PATENT DOCUMENTS

| | | | |
|---|---|---|---|
| WO | 9903726 A1 | 1/1999 | |
| WO | 9925989 A2 | 5/1999 | |
| WO | 02079021 A2 | 10/2002 | |
| WO | 2004079222 A2 | 9/2004 | |
| WO | 2005054046 A1 | 6/2005 | |
| WO | 2009006165 A1 | 1/2009 | |

OTHER PUBLICATIONS

European Search Report (Application No. EP 11 15 2598) dated Nov. 16, 2012.
Partial European Search Report (Application No. EP 11 15 2598) dated Jul. 17, 2012.
Decision to Grant (Application No. EP 11 15 2598) dated Apr. 25, 2014, 1 page.
Response to European Search Report (Application No. EP 11 15 2598) dated May 15, 2013, 8 pages.

* cited by examiner

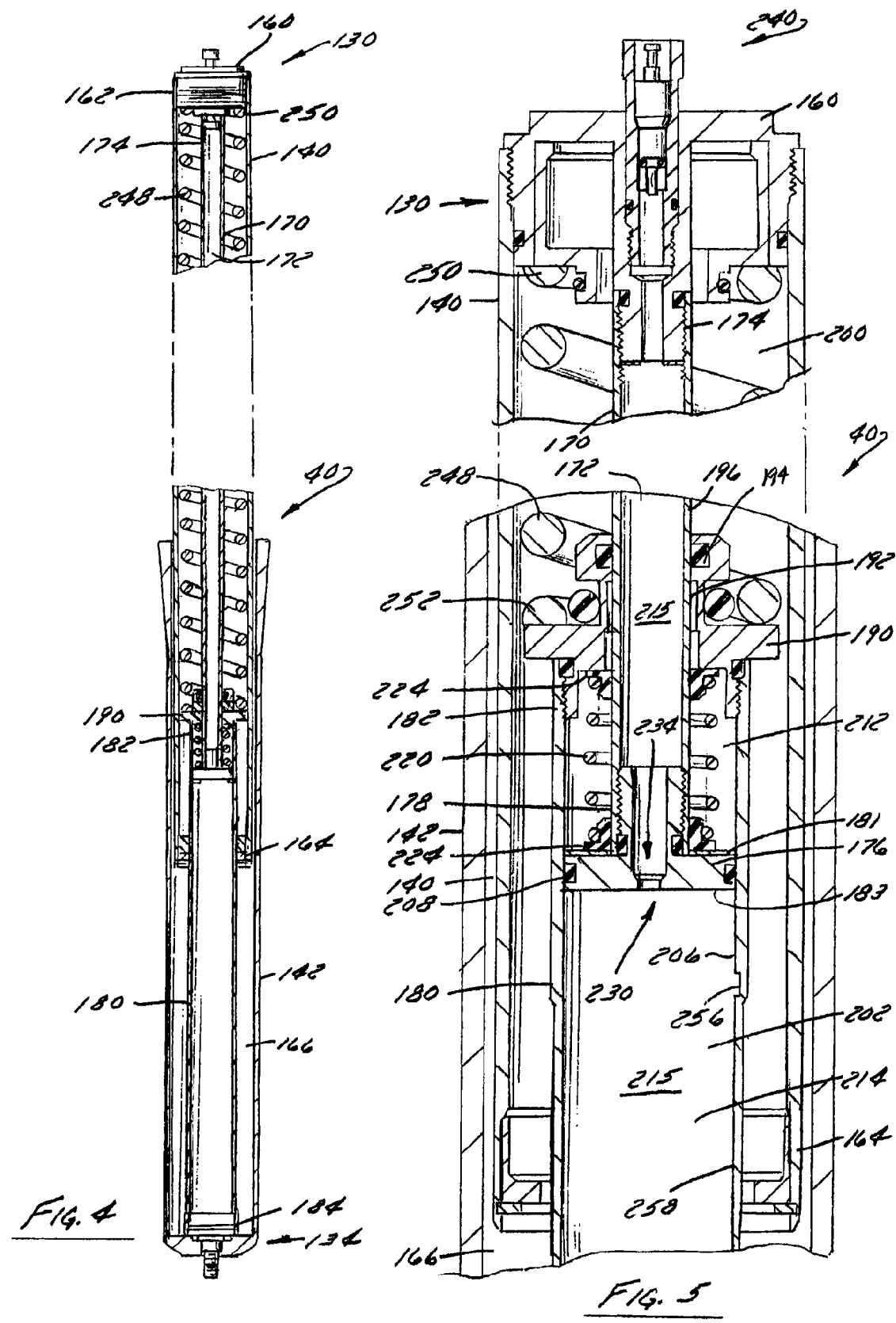

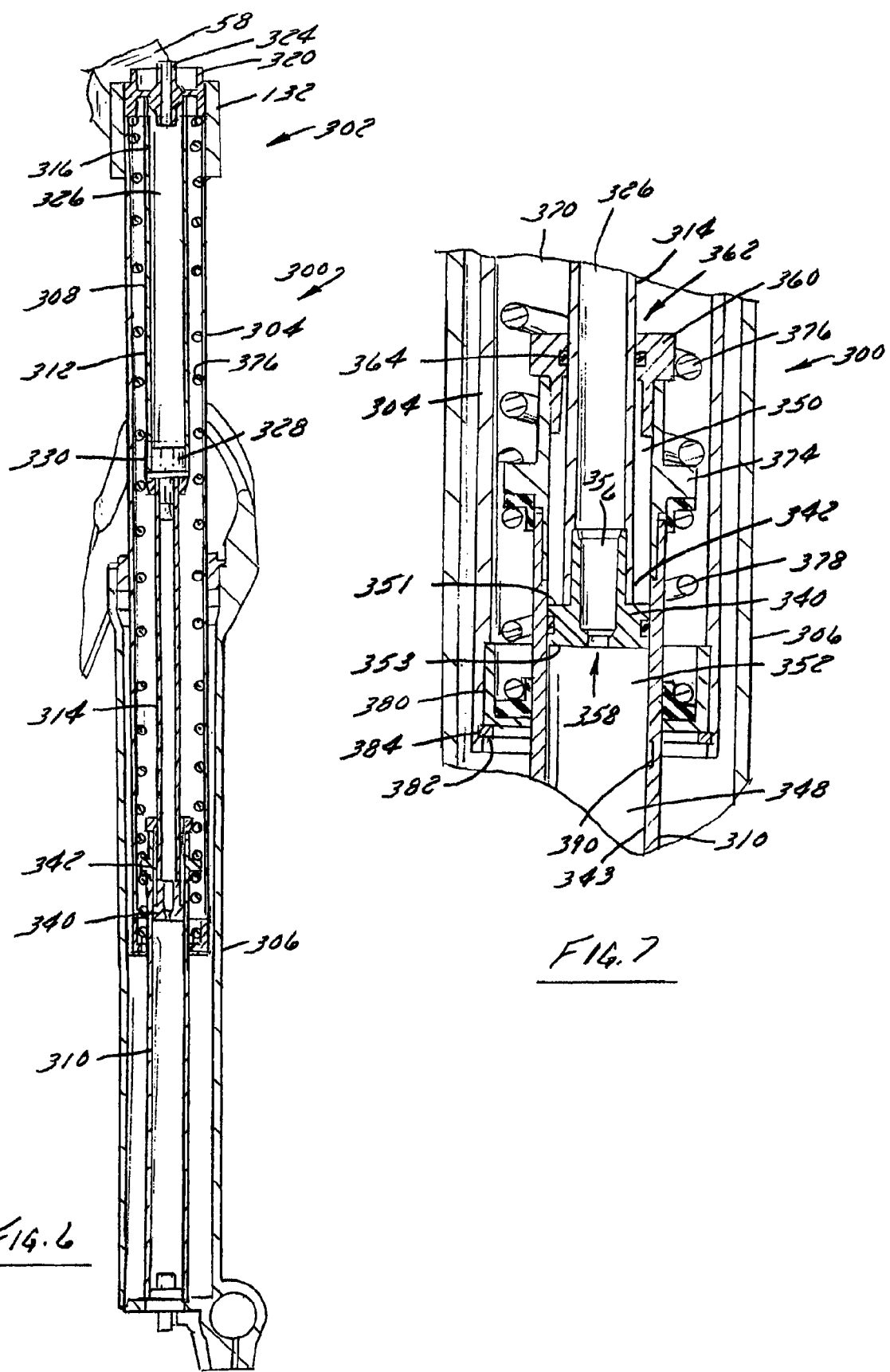

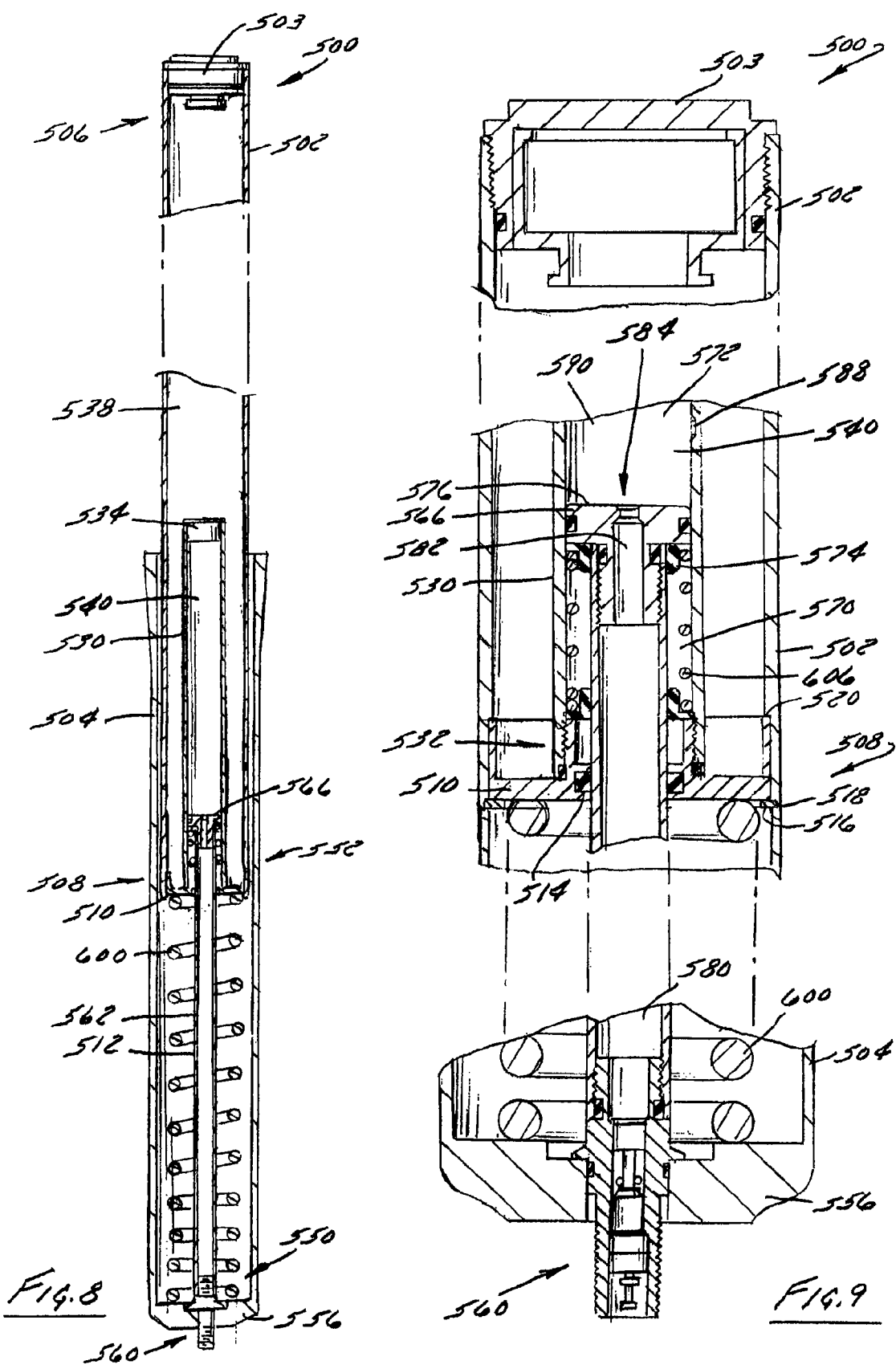

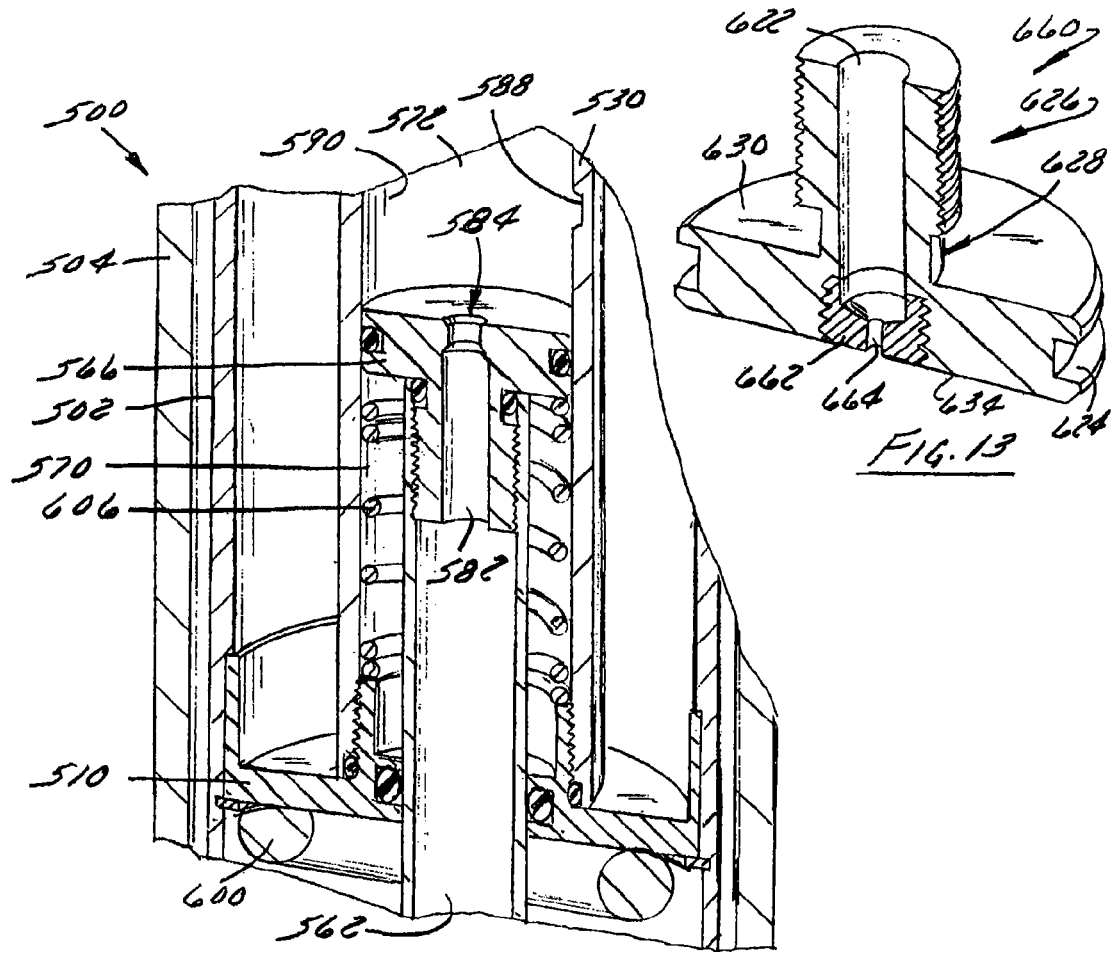
FIG. 10
FIG. 13
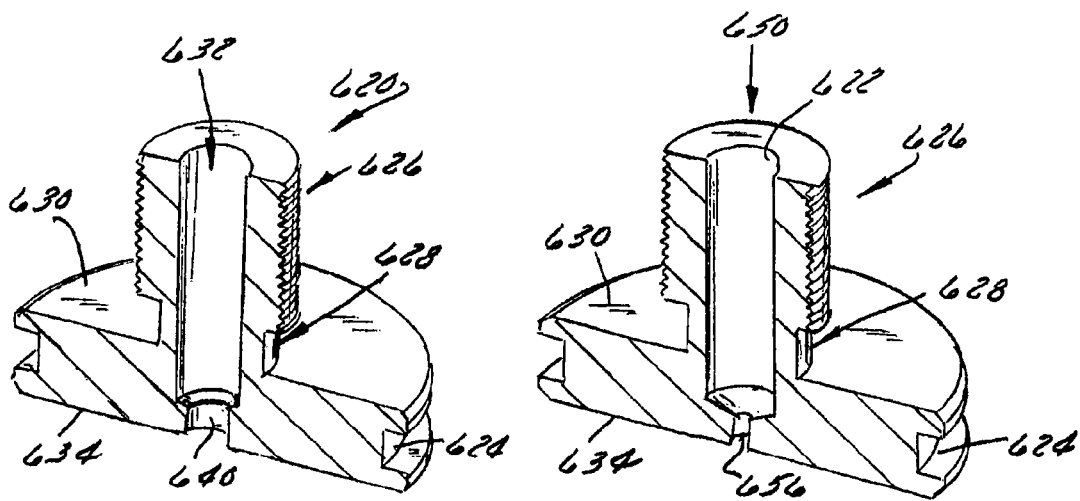
FIG. 11
FIG. 12

BICYCLE AIR SHOCK ASSEMBLIES WITH TUNABLE SUSPENSION PERFORMANCE

CROSS-REFERENCE TO RELATED APPLICATIONS

This application is a Continuation of U.S. application Ser. No. 12/704,292, filed Feb. 11, 2010, now U.S. Pat. No. 8,511,448, which claims the benefit of U.S. Provisional Application No. 61/300,182, filed Feb. 1, 2010, both of which are incorporated herein by reference in their entirety.

BACKGROUND OF THE INVENTION

The present invention relates generally to bicycles and, more particularly, to air shock assemblies that are constructed to facilitate adjustable controlled movement between movable members of a bicycle, such as a frame and a wheel assembly.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The front wheel assembly is commonly mounted between a pair of forks that are pivotably connected to the frame proximate the head tube. The foregoing description represents the construction of a conventional bicycle frame which does not possess a suspension having any shock absorbing characteristics.

The increased popularity in recent years of off-road cycling, particularly on fairly rough terrain and cross-country, as well as an interest in reducing discomfort associated with rougher road riding, has made shock absorbing systems a desirable attribute in biking system. A bicycle with a properly designed suspension system is capable of traveling over extremely bumpy, uneven terrain and up or down very steep inclines. Suspension bicycles are less punishing, reduce fatigue, reduce the likelihood of rider injury, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles. Bicycles equipped with suspension systems has dramatically increased over the last several years. In fact, many bicycles are now fully suspended, meaning that the bicycle has both a front and rear wheel suspension systems. Front suspensions were the first to become popular. Designed to remove the pounding to the bicycle front end, the front suspension is simpler to implement than a rear suspension. A front suspension fork is easy to retrofit onto an older model bicycle whereas a rear suspension will increase traction and assist in cornering and balance the ride.

During cycling, as the bicycle moves along a desired path, discontinuities of the terrain are communicated to the assembly of the bicycle and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems are one such feature.

Even though suspension features have proliferated in bicycle constructions, the performance of the suspension as well as the structure of the bicycle are often limited to or must be tailored to cooperate with the structure and operation of the shock. Commonly, both ends of the shock are secured to the bicycle between movable frame members where movement is intended to be arrested, dampened, or otherwise altered. The shock is often connected between a portion of the frame and structure proximate an axle of an associated wheel to provide a desired travel distance and/or resistance to the relative displacement of the structures secured to the generally opposite ends of the shock. The incorporation of the shock member with the bicycle and the internal operation of the shock assembly generally determine the motion performance of the suspension.

Altering the suspension performance of a particular bicycle can require changing the entire shock, changing components of the shock, altering the physical arrangement of the shock relative to the bicycle, and/or manipulating an operating pressure of the shock assembly. Understandably, the desired operation of a shock assembly can vary due to a number of characteristics including terrain conditions, rider suspension performance preference, rider size and weight, and/or bicycle geometry.

Air or fluid shock assemblies generally provide the most convenient means for adjusting operation of the shock assembly. The performance of many air shock assemblies can be adjusted by manipulating the pressure of an air or fluid chamber. However, the adjustability of such systems is commonly limited as a function of the properties of the fluid itself and/or the geometric constraints of the shock assembly. To increase the adjustability or the operating range of such systems, many fluid shock assemblies are provided with fluid reservoirs or chambers that are external to the generally linear body of the shock assembly. Such configurations require greater spatial consideration for integrating the shock assembly with the underlying bicycle. Such configurations also complicate the construction of the shock assembly by requiring the formation of various fluid communication paths for communicating fluid into and out of the shock leg.

Although other shock assemblies provide air or fluid chambers that remain fully internal to the generally linear body of the shock assembly, such assemblies present other shortcomings. Commonly, such systems include a fluid chamber that is formed by one of the stanchion tube or the leg or slider tube. A piston telescopically cooperates with the respective tube and compresses the fluid when the shock assembly is subjected to a compression load. Commonly, such systems also include a floating piston that also cooperates with the respective tube to accommodate changes to the fluid chamber. Such configurations create undesirable dependencies between the size of the fluid chamber, the size of the stanchion tube, and the size of the pistons to satisfy given geometric and suspension performance criteria.

In an attempt to increase the application of a given shock assembly, others have generated shock assemblies that are constructed to accommodate one of a number of coil springs. Shock performance can be achieved simply by replacing a coil spring contained within the shock assembly. Unfortunately, such systems require manufactures provide a number of springs that are configured to specific shock geometries. Such a requirement increases operating costs for manufacturers and complicates distribution by requiring providing of a number of coil springs for given shock geometries and desired suspension performance.

Shocks with interchangeable coil springs are also adjustable in less than a desirable manner. Commonly, such adjustment requires at least partial disassembly of the shock assembly. Such disassembly commonly requires specialized tools and knowledge. It is therefore impractical to reconfigure the performance of such shock assemblies under in-field conditions.

If a rider has multiple bicycles, as many competitive riders do, acquiring the components and knowhow to alter the performance of the suspension of a number of bicycles can be particularly expensive. With respect to shock manufacturing, as the structure of bicycle suspension features changes, shocks must be restructured to cooperate with the new bicycle structure. Shock design, construction, and assembly can become particularly costly in those instances where a variety of different shocks or coil springs having different shock performance characteristics must be provided for one particular bicycle to satisfy individual rider preferences and/or preferences associated with varied riding conditions. Satisfying individual rider preferences across the various product platforms of various bicycle manufactures requires providing uncountable specific shock constructions.

Therefore, there is a need for a shock system that can be configured to provide a conveniently tunable suspension performance. There is a further need for a shock system that can provide a variety of shock performances in a manner that at least partly decouples the dependency of the performance of the shock assembly from the physical geometry of the shock assembly. There is a further need for a bicycle shock system that can be quickly and efficiently tuned by the rider to provide a desired suspension performance specific to particular conditions.

BRIEF DESCRIPTION OF THE INVENTION

The present invention provides a bicycle air shock assembly that addresses one or more of the drawbacks discussed above. One aspect of the invention discloses a bicycle air shock absorber assembly that includes a hollow piston rod that is telescopically associated with a hollow compression rod. The piston rod and compression rod are positioned within a casing of the shock assembly. A piston is supported by the piston rod and divides the volume of the compression rod to form a negative air spring chamber and a positive air spring chamber that includes the volume of the piston rod. An optional coil spring is positioned within the casing and acts concurrently with the positive air spring chamber to resist compression of the shock assembly.

Another aspect of the invention discloses a bicycle shock absorber assembly that includes a stanchion tube and a slider tube that telescopically cooperates with the stanchion tube. The shock assembly includes a piston rod and a compression rod that telescopically cooperate with one another and that are enclosed by the stanchion tube and the slider tube. A piston is supported by the piston rod and is positioned within the compression rod. A negative air spring is formed by a volume that is enclosed by a first side of the piston, an interior surface of the compression rod, and an exterior surface of the piston rod. A second side of the piston, another portion of the interior surface of the compression rod, and an interior surface of the piston rod enclose another volume that forms a positive air spring. Such a construction decouples the suspension performance of the shock assembly from the outwardly directed physical shape of the shock assembly.

Another aspect of the invention that is combinable with the one or more of the above aspects discloses a bicycle air shock having an outer casing that includes a head tube that telescopically cooperates with a leg tube. The shock includes a piston rod that has a hollow core and which extends longitudinally within the outer casing. A compression rod that has a hollow core is telescopically associated with the piston rod. A coil spring extends longitudinally within the outer casing and is positioned radially outward with respect to a radius of the piston rod. A piston is attached to the piston rod and is slidably positioned within the hollow core of the compression rod so that the piston divides the hollow core of the compression rod into a negative air spring chamber and a positive air spring chamber wherein the positive air spring chamber is fluidly connected to the hollow core of the piston rod. Such a construction allows parallel operation of the positive air spring chamber and the coil spring.

Another aspect of the invention that is combinable with one or more of the above aspects discloses a method of controlling motion of a bicycle shock assembly. The method includes telescopically associating a hollow piston rod with a hollow compression rod. The piston rod and the compression rod are enclosed within a stanchion tube and a slider tube that are telescopically associated with respect to one another. A volume of the compression rod is divided into a first chamber and a second chamber with a piston that 1) is attached to the piston rod, 2) is moveable within the compression rod, and 3) sealingly cooperates with an interior wall of the compression rod. A positive air spring chamber is formed by fluidly connecting a volume of the piston rod to the second chamber of the compression rod with an orifice that is formed in the piston. A coil spring is positioned between the piston rod and one of the stanchion tube and the slider tube so that the coil spring and the positive air spring chamber concurrently contribute to resist changes in length of the shock assembly. Such a construction allows convenient individualization of the operation of the shock assembly to given rider preferences.

Another aspect of the invention that is combinable with one or more of the above aspects discloses positioning a top out spring in the space associated with the negative air spring chamber. Another aspect of the invention discloses providing a variable sized orifice in the piston between the piston rod and the compression rod so that performance of the shock assembly can be altered by changing the size or shape of the orifice. Preferably, the orifice forms a venturi. Preferably, the venturi section is interchangeable with respect to the piston and/or the piston rod for altering the performance of the shock assembly.

Another aspect of the invention discloses providing a bypass that allows fluid communication between the negative air spring chamber and the positive air spring chamber. Preferably, such a construction allows the negative air spring chamber to be tuned to a desired operation without providing a direct fluid passage between the negative air spring chamber and atmosphere.

Another aspect of the invention that is combinable with one or more of the above aspects discloses altering operation of the shock assembly by altering the shape of the piston rod. Preferably, the piston rod includes an interchangeable section that can be changed so as to alter the fluid capacity of the positive air spring chamber. Preferably, the shock assembly includes an operable valve assembly that allows selective external fluid communication with the positive air spring chamber.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

FIG. 4 is a cross section view of one of the shock assemblies shown in FIG. 1;

FIG. 5 is a detailed view of the shock assembly shown in FIG. 4;

FIG. 6 is a cross section view of a shock assembly according to another embodiment of the invention;

FIG. 7 is a detailed view of the shock assembly shown in FIG. 6;

FIG. 8 is a cross-section view of a shock assembly according to another embodiment of the invention;

FIG. 9 is a detailed view of the shock assembly shown in FIG. 8;

FIG. 10 is a detailed perspective cross-section view of the piston assembly shown in FIG. 9;

FIG. 11 is a perspective cross-section view of the piston shown in FIG. 10;

FIG. 12 is a view similar to FIG. 11 and shows another piston according to the invention;

FIG. 13 is a view similar to FIG. 11 and shows another embodiment of a piston of the present invention;

DETAILED DESCRIPTION OF THE PREFERRED EMBODIMENT

Figure 1:
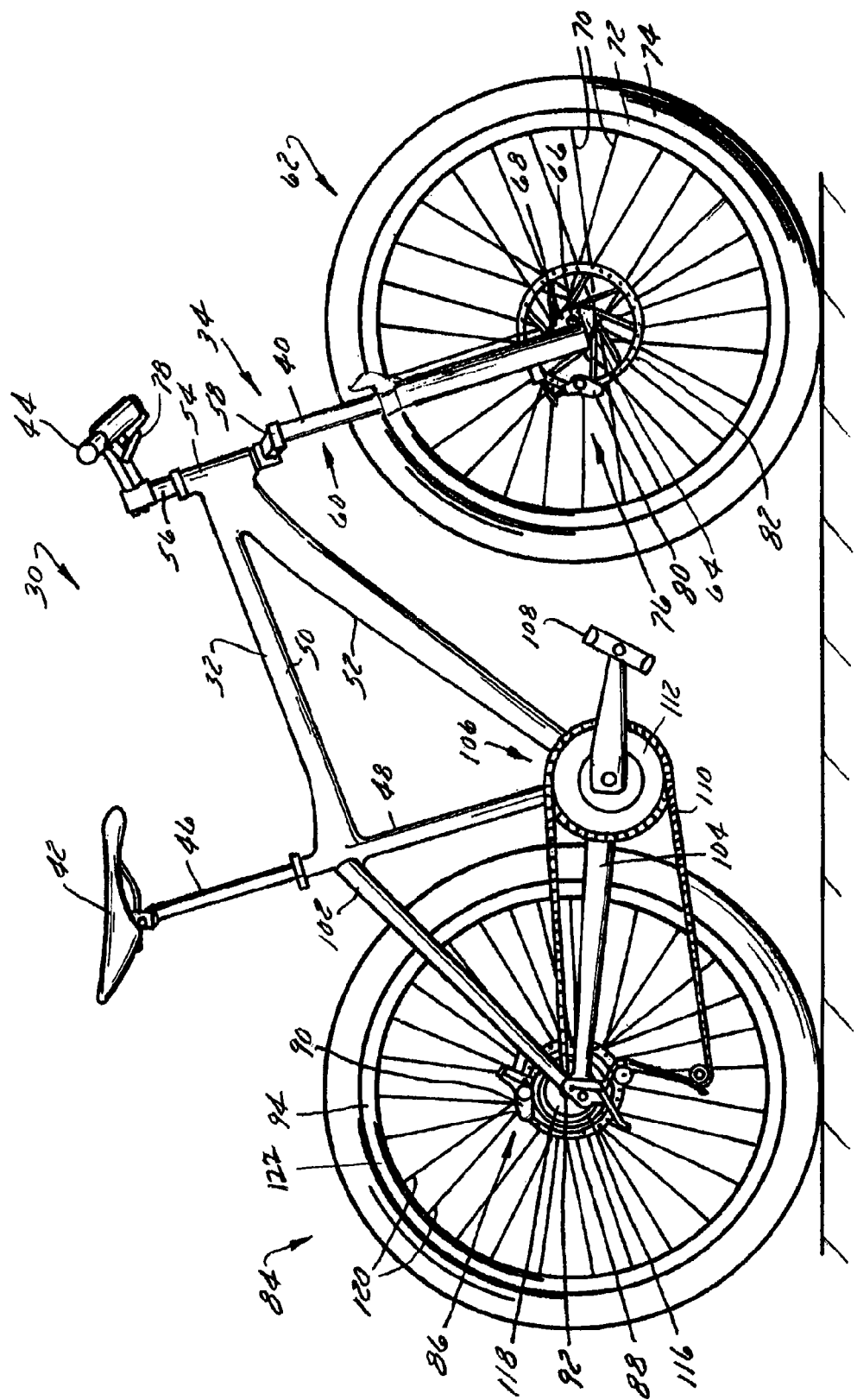
FIG. 1 is an elevational view of a bicycle equipped with a steerer assembly having a pair of shock assemblies according to one embodiment of the present invention.

FIG. 1 shows a bicycle 30 having a frame assembly 32 equipped with a front wheel suspension system 34 that includes a pair of shocks, shock absorbers, or shock assemblies 40 according to one embodiment of the present invention. As explained further below, it is envisioned that bicycle 30 be equipped with one or shock assemblies according to the present invention and that the shock assemblies dampen movement between one or more of the front and rear wheel assemblies and the seat and/or handlebars of the underlying bicycle. Bicycle 30 is merely exemplary of one style of bicycle envisioned to benefit from shock assemblies like those disclosed herein.

Bicycle 30 includes a seat 42 and handlebars 44 that are attached to frame assembly 32. A seat post 46 is connected to seat 42 and slidably engages a seat tube 48 of frame assembly 32. A top tube 50 and a down tube 52 extend forwardly from seat tube 48 to a head tube 54 of frame assembly 32. Handlebars 44 are connected to a steerer tube or stem 56 that passes through head tube 54 and engages a fork crown 58. Shocks 40 form forks 60 of bicycle 30 and extend from generally opposite ends of fork crown 58. A downward facing end of each shock 40 includes a fork tip 64 that is constructed to support a front wheel assembly 62. Fork tips 64 engage generally opposite sides of an axle 66 that cooperates with a hub 68 of front wheel assembly 62. A number of spokes 70 extend from hub 68 to a rim 72 of front wheel assembly 62. A tire 74 extends about rim 72 such that rotation of tire 74, relative to forks 60, rotates rim 72 and hub 68. Providing each fork 60 as a shock absorber 40 allows translation of axle 66 of front wheel assembly 62 relative to frame assembly 32.

Bicycle 30 includes a front brake assembly 76 having an actuator 78 attached to handlebars 44. Brake assembly 76 includes a caliper 80 that cooperates with a rotor 82 to provide a stopping or slowing force to front wheel assembly 62. A rear wheel assembly 84 of bicycle 30 also includes a disc brake assembly 86 having a rotor 88 and a caliper 90 that are positioned proximate a rear axle 92. A rear wheel 94 is positioned generally concentrically about rear axle 92. Understandably, one or both of front wheel assembly 62 and rear wheel assembly 84 could be equipped with other brake assemblies, such as brakes assemblies that include structures that engage the rim or tire of a respective wheel assembly.

Preferably, each fork 60 is provided as a shock absorber 40 so as to allow translation of axle 66 of front wheel assembly 62 relative to frame assembly 32. Although each fork 60 is shown as having respective ends secured proximate one of frame assembly 32 and axle 66, it is appreciated that the hereafter description of shocks according to one or more of the embodiments of the present invention are equally applicable to bicycle rear wheel suspension features. An exemplary rear wheel suspension system is disclosed in applicants co-pending U.S. Patent Application Publication No. 2008/0252040, the disclosure of which is incorporated herein. It is envisioned that front and rear wheel bicycle suspension systems can yield benefits from shock assemblies according the present invention.

Referring to rear wheel assembly 84, a seat stay 102 and a chain stay 104 extend rearward from seat tube 48 and offset rear axle 92 of rear wheel assembly 84 from a crankset 106. Crankset 106 includes oppositely positioned pedals 108 that are operationally connected to a flexible drive member, such as a belt or a chain 110, via a chain ring, sprocket, or sprocket set 112. Rotation of chain 110 communicates a drive force to rear wheel assembly 84 of bicycle 30. A gear cluster 116 is positioned proximate axle 92 and is engaged by chain 110. Gear cluster 116 is generally concentrically orientated with respect to rear axle 92 and includes a number of variable diameter gears. Gear cluster 116 is operationally connected to a hub 118 of rear wheel 94 of rear wheel assembly 84. A number of spokes 120 extend radially between hub 118 and a rim 122 of rear wheel 94. As is commonly understood, rider operation of pedals 108 drives chain 110 thereby driving rear wheel 94 which in turn propels bicycle 30.

Understandably, the construction of bicycle 30 shown in FIG. 1 is merely exemplary of a number of bicycle configurations usable with shock assemblies according to the present invention. That is, whereas bicycle 30 is shown as having only a front wheel suspension feature or assembly, it is envisioned that shock assemblies according to the present invention provide either front or rear wheel shock or vibration dampening or isolation. It is further appreciated that the shock constructions of the present invention are equally applicable to street or road bikes as well as other bicycle configurations such as mountain and/or dirt bikes. It is further appreciated that the shock assemblies of the present invention may be applicable to any of a number of vehicle configurations in addition to the bicycle configuration shown.

Figure 2:
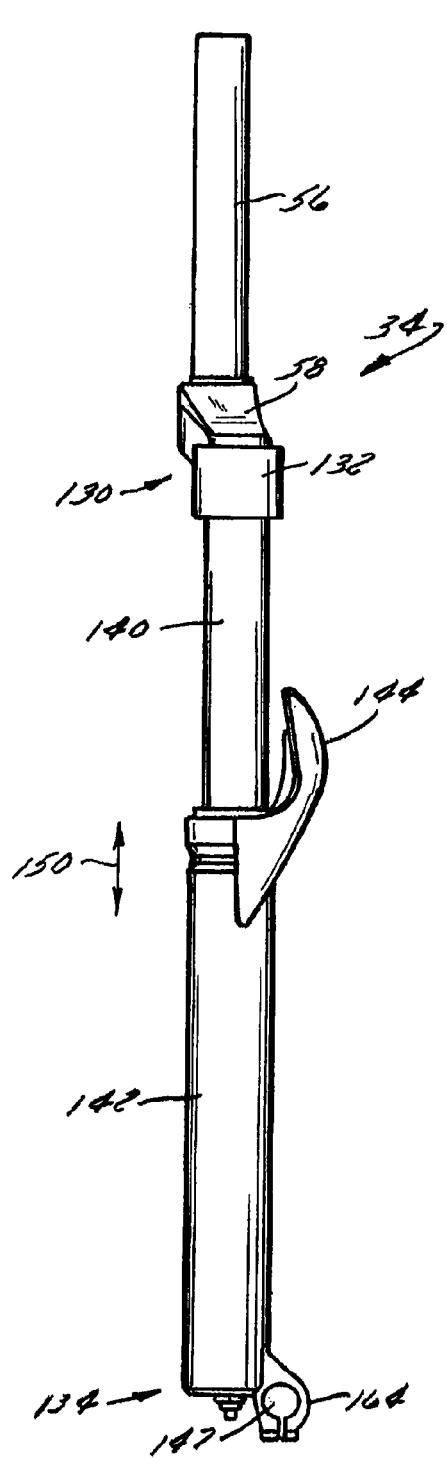
FIG. 2 is a side view of the steerer assembly removed from the bicycle shown in FIG. 1.
Figure 3:
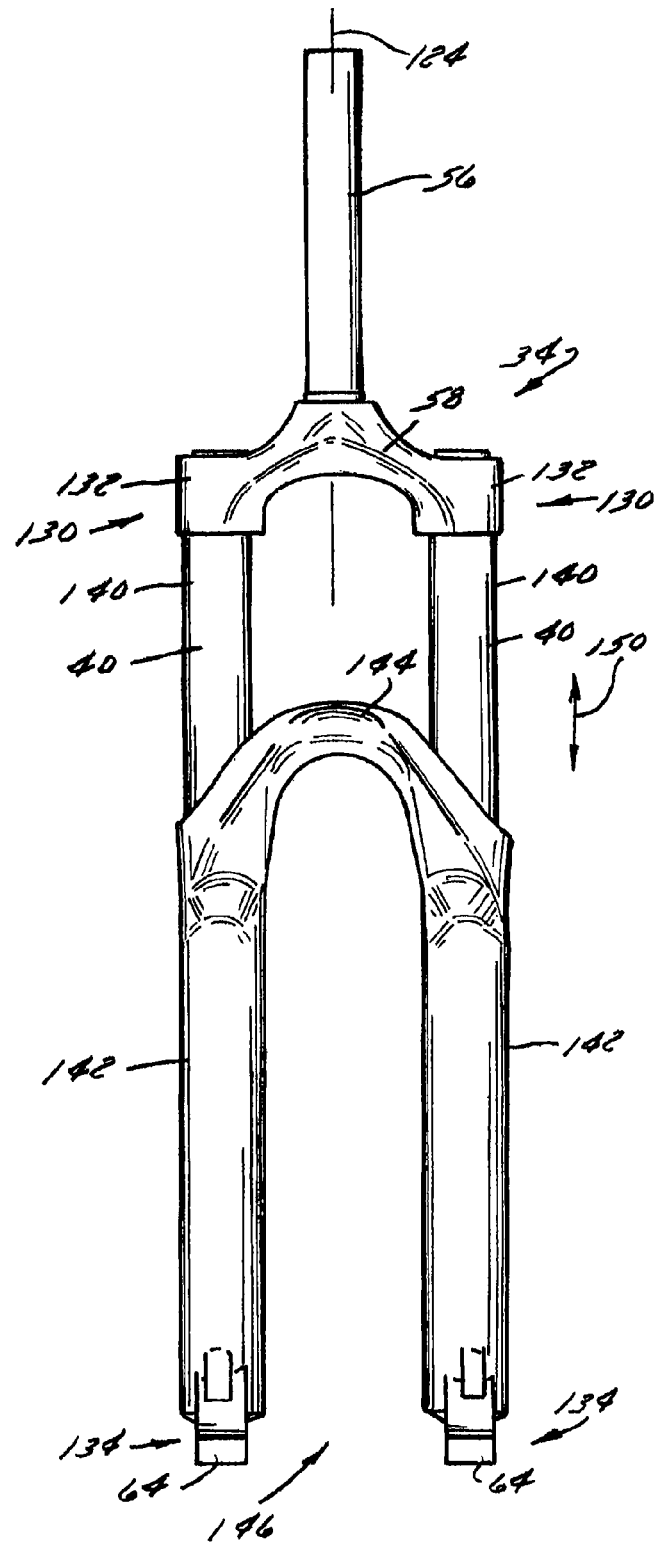
FIG. 3 is a front elevation view of the steerer assembly shown in FIG. 2.

Referring to FIGS. 2 and 3, bicycle 30 includes two shock assemblies 40 that are each secured to fork crown 58 such that shock assemblies 40 form the forks 60 of bicycle 30. A first end 130 of each shock assembly 40 is secured to a respective shoulder or arm 132 of fork crown 58. A second end 134 of each shock assembly 40 either forms or has fork tip 64 attached thereto. Stem 56 is generally longitudinally aligned and laterally centered with respect to a longitudinal axis of the pair of fork assemblies 40. Stem 56 forms a steerer tube and extends from fork crown 58 in a direction generally opposite shock assemblies 40. Stem 56 engages frame 32 of bicycle 30 such that rotation of stem 56 about a longitudinal axis 124 of stem 56 rotates forks 60 about axis 124 so as to steer bicycle 30.

Each shock assembly 40 includes a first sleeve, tube, or stanchion tube 140 that cooperates with a second sleeve, tube, leg tube, or slider tube 142. Each stanchion tube 140 and slider tube 142 are telescopically associated with respect to one another and collectively form a casing or external surface of shock assembly 40. Preferably, each stanchion tube 140 is telescopically received within the corresponding slider tube 142. An optional arch or brake arch 144 connects each slider tube 142 of the adjacent shock assemblies 40 and defines a wheel cavity 146 between the adjacent forks 60. As is commonly understood, each fork tip 64 includes a dropout or opening 147 (FIG. 2) that receives a respective end of axle 66. During loading and unloading of front wheel suspension system 34, stanchion tubes 140 and slider tubes 142 translate relative to one another, indicated by arrow 150, thereby altering the distance between fork tips 64 and arms 132 of fork crown 58. Shock assemblies 40 absorb and dissipate a portion of the energy associated with such translation and thereby limit communication of impact or shock forces between frame assembly 32 and wheel assemblies 62, 84.

FIGS. 4 and 5 show cross-sectional views of shock assembly 40. Shock assembly 40 includes a stanchion tube top cap or top cap 160 that is secured to a first end 162 of stanchion tube 140. A second end 164 of stanchion tube 140 is telescopically received than a cavity 166 of slider tube 142. Second end 164 of stanchion tube 140 slidably cooperates with a compression tube or compression rod 180 contained in slider tube 142. A piston tube or piston rod 170 is connected to stanchion tube cap 160 and includes a hollow interior chamber 172 that forms a portion of a positive air spring as described further below. A first end 174 of piston rod 170 is sealing connected to top cap 160 of stanchion tube 140. A piston assembly 176 is attached to a lower end 178 of piston rod 170 that is opposite first end 174. Piston rod 170 slidably and sealingly cooperates with compression rod 180 such that a first side 181 of piston assembly 176 faces a first portion of the volume enclosed by compression rod 180 and a second side 183 of piston assembly 176 face a second portion of the volume enclosed by compression rod 180. The fluid division of compression rod 180 by piston assembly 176 provides shock assembly 40 with a negative air spring chamber and a positive air spring chamber as described further below.

Compression rod 180 includes a first end 182 that faces toward piston rod 170 and a second end 184 that is supported by and sealingly attached to lower end 134 of slider tube 142. A compression rod top cap 190 is secured to first end 182 of compression rod 180 and includes a passage 192 formed therethrough. Passage 192 slidably and sealingly cooperates with piston rod 170. A seal 194 is supported by compression rod top cap 190 and interacts with an exterior surface 196 of piston rod 170 to prevent fluid communication between a chamber 200 enclosed by stanchion tube 140 and slider tube 142 and a chamber 202 enclosed by compression rod 180 and piston rod 170.

Piston assembly 176 slidably cooperates with an interior wall 206 of compression rod 180. A seal 208 is disposed between piston assembly 176 and wall 206 of compression rod 180 and prevents fluid communication between a first portion or first chamber 212 and a second portion or chamber 214 of shock assembly 40. As described further below, first chamber 212 provides a negative air spring chamber and second chamber 214 associated with compression rod 180, in combination with the volume enclosed by piston rod 170, forms a positive air spring chamber of shock assembly 40.

Shock assembly 40 includes a top-out coil spring 220 that is contained in first chamber 212 and disposed between piston assembly 176 and compression rod top cap 190. A spring seat 224 positions each of the alternate ends of top out spring 220 relative to piston rod 170, compression rod top cap 190, and piston assembly 176.

Piston assembly 176 includes an opening 230 that allows fluid communication between chamber 172 of piston rod 170 and chamber 202 of compression rod 180. Preferably, opening 230 includes a variable or adjustable venturi or restriction 234 whose size can be manipulated to alter the suspension performance of shock assembly 40. Preferably, as described further below, piston assembly or restriction 234 is interchangeable so that one means for adjusting the performance of shock assembly 40 includes replacing the piston assembly or restriction. Alternatively, it is envisioned that the size of restriction 234 could be manipulated from outside of the shock assembly via a valve arrangement that can be manually manipulated without disassembling of the shock assembly.

As shown in FIG. 5, shock assembly 40 also includes an operable valve assembly 240, such as a Schrader valve, that is supported by stanchion tube top cap 160. Valve assembly 240 fluidly separates piston rod chamber 170 from atmosphere and allows a user to alter the operating pressure of shock assembly 40. Valve assembly 240 is constructed to cooperate with a bicycle pump or other gas source for selectively altering the operating pressure associated with piston rod chamber 172 and compression rod volume 202.

Shock assembly 40 also includes a primary positive coil spring 248 that is disposed within stanchion tube 140 of shock assembly 40 and radially between the stanchion tube and piston rod 170 and/or compression rod 180. Primary coil spring 248 includes a first end 250 that seats against stanchion tube top cap 160 and a lower end 252 that seats against compression rod top cap 190. Primary coil spring 248 and primary air spring chamber 215 concurrently resist compression stroke translation of shock assembly 40. Said another way, primary coil spring 248 and positive air spring chamber 215 operate in parallel with respect to compression or shorting movements of stanchion tube 140 relative to slider tube 142.

At a given orientation of shock assembly 40, piston rod 170 and piston assembly 176 translate relative to compression rod 180 such that piston assembly 176 aligns with a bypass 256 formed on an interior wall 258 of compression rod 180. Bypass 256 allows fluid communication between positive air spring chamber 215 and negative air spring chamber 212 only when seal 208 of piston assembly 176 is aligned therewith. Such interaction allows the operating pressure of negative air spring chamber 212 to be set in a manner that does not require a direct to atmosphere fluid connection with negative air chamber 212.

It is further appreciated that the operating pressure of negative air spring 212 can be manipulated as a function of the position of bypass 256 with respect to the longitudinal axis of shock assembly 40. Moving bypass 256 in a direction further from compression rod top cap 190 provides a greater negative air spring operating pressure whereas moving bypass 256 in a direction nearer to compression rod top cap 190 provides a negative air spring operating pressure that is nearer to an at rest operating pressure of positive air spring chamber 215. Accordingly, positioning bypass 256 at different positions along compression rod 180 alters the negative air spring performance of shock assembly 40.

To configure shock assembly 40 for a desired use, a user need simply interact with fill valve assembly 240 to increase or decrease the air pressure of positive air spring chamber 215 to alter the operating performance of both positive air spring chamber 215 and negative air spring chamber 212. Understandably, an initial pressurization over inflation will provide a desired operating pressure after cycling of the shock to a position wherein piston assembly 176 allows fluid communication with negative air spring chamber 212 via bypass 256. As described further below with respect to FIGS. 14-16, manipulation of restriction 234 and/or the operating pressure of shock assembly 40 conveniently manipulates the suspension operating performance of shock assembly 40.

FIGS. 6 and 7 are cross-section views of a shock assembly 300 according to another embodiment of the invention. Shock assembly 300 is generally similar to shock assembly 40 in that it includes a piston rod that extends in a downward direction and telescopically cooperates with a compression rod, includes a positive coil spring that is positioned between the casing and the piston rod and/or compression rod, includes a positive air spring that includes a volume defined by the piston rod, and includes positive and negative air springs that are defined by structures other than the stanchion tube and the slider tube of the shock assembly.

As shown in FIG. 6, shock assembly 300 includes a stanchion tube 304 that telescopically cooperates with a slider tube 306. An upper end 302 of shock assembly 300 is secured to an arm 132 of a fork crown 58 in a manner similar to that described above with respect to shock assembly 40. Shock assembly 300 includes a piston rod assembly 308 that extends longitudinally within stanchion tube 304 and slider tube 306. Piston rod assembly 308 slidably cooperates with a compression rod 310 in a telescopic manner.

Piston rod assembly 308 includes a first portion 312 that is sealing connected to a second portion 314. An upper end 316 of first portion 312 of piston rod assembly 308 is sealingly connected to a stanchion tube top cap 320. A selectively operable valve assembly 324 is also attached to stanchion tube 320 and allows selective fluid interchange between a cavity 326 of piston rod assembly 308 and atmosphere and/or a gas pressure source. A piston rod coupler 328 sealingly connects a lower end 330 of first portion 312 of piston rod assembly 308 to second portion 314 of piston rod assembly 308. A passage is formed though piston rod coupler 328 and fluidly connects the interior volumes of first portion 312 and second portion 314 of piston rod assembly 308.

As compared to shock assembly 30, the two part piston rod assembly 308 of shock assembly 300 allows greater adjustability of the shock assembly by manipulation of the shock gas volumes, provides a robust piston assembly, provides a piston assembly that provided improved positive coil spring guidance, allows for the convenient integration of a bottom out bumper as are commonly understood in the art, and provides for the generation of a more progressive spring curve nearer the end of the stroke of the shock assembly.

A piston assembly 340 is attached to a distal end of second portion 314 of piston rod assembly 308 and slidably interacts with an inner wall 346 of compression rod 310. Piston assembly 340 divides a total volume 348 of compression rod 310 into a first chamber that forms a negative air spring chamber 350 and a second chamber that combines with the volume of piston rod assembly 308 to form a positive air spring chamber 352. A first face 351 of piston assembly 340 faces negative air spring chamber 350 and a second face 353 of piston assembly 340 faces positive air spring chamber 352. Piston assembly 340 includes a passage 356 having a passage or orifice 358 that fluidly connects the volume of piston rod assembly 308 with the positive air spring chamber 352 associated with compression rod 310.

As shown in FIGS. 6 and 7, a lower end 342 of second portion 314 of piston rod assembly 308 sealingly supports piston assembly 340 in a slidable manner between the respective chambers 350, 352 associated with compression rod 310. Referring to FIG. 7, second section 314 of piston rod assembly 308 slidably cooperates with a compression rod top cap 360. Compression rod top cap 360 includes an opening 362 that is configured to slidably engage second section 314 of piston rod assembly 308. A seal 364 is positioned circumferentially about opening 362 of compression rod top cap 360 so as to fluidly separate negative air spring chamber 350 from a volume 370 formed between stanchion tube 304 and piston rod assembly 308.

Compression rod 360 includes a spring seat arm 374 that extends in a radially outward direction and interacts with a first coil spring or positive coil spring 376 and a top out coil spring 378. Coil spring 376 is positioned to extend between stanchion tube top cap 320 and compression rod top cap 360. Coil spring 376, working in parallel with positive air spring chamber 352, resists compression of stanchion tube 304 relative to slider tube 306 and compression rod 310. Coil spring 378 is disposed between spring seat arm 374 and a stanchion tube lower cap 380. A retainer, such as a snap ring 382 or the like, is seated in a groove 384 formed in stanchion tube 304 and secures stanchion tube lower cap 380 relative to the longitudinal axis of stanchion tube 304. During an expansion stroke, as stanchion tube 304 and slider tube 306 move in generally opposite directions away from one another, negative air spring chamber 350 and top out coil spring 378 dampen the full longitudinal translation of stanchion tube 304 with respect to slider tube 306.

Still referring to FIG. 7, shock assembly 300 includes a bypass 390 formed an interior wall 343 of compression rod 310. Similar to shock assembly 40, bypass 390 allows fluid communication between first chamber 350 and second chamber 352 of compression rod 310 as piston assembly 340 translates therepast. Also similar to shock assembly 40, altering the position of bypass 390 along the longitudinal length of compression rod 310 alters the volume of negative air spring chamber 350 and thereby alters the dampening performance of shock assembly 300.

As described further below, chamber 326 of piston rod assembly 308 is fluidly connected, contributes to the suspension performance, and is therefore a portion of positive air spring chamber 352. Passage 358 interferes with free fluid communication between chamber 326 of piston rod assembly 308 and chamber 352 of compression rod 310. Accordingly, like shock assembly 40, the performance of shock assembly 300 can also be manipulated by changing the shape and/or size associated with passage 358. It is further envisioned that one or both of first section 312 and second section 314 of piston rod assembly 308 be interchangeable with piston rod sections having different sizes and/or lengths so as to alter the volume associated with chamber 326. It is appreciated that altering volume 326 associated with piston rod assembly 308 will alter the performance and versatility of shock assembly 300 as is described further below with respect to FIGS. 14-17.

FIGS. 8, 9 and 10 show a shock assembly 500 according to another embodiment of the invention. Shock assembly 500 includes a stanchion tube 502 that telescopically cooperates with a slider tube 504. Stanchion tube 502 includes a stanchion tube top cap 503 that is secured to a first end 506 of stanchion tube 502. First end 506 of stanchion tube 502 is preferably configured to cooperate with a fork crown 58 in a manner similar to that described above. A lower end 508 of stanchion tube 502 includes a bottom end cap 510 that slidably cooperates with a piston rod 512. A seal 514 is positioned between the interface of bottom end cap 510 and piston rod 512 and provides a sealed and slidable connection therebetween. A retainer, such as a snap ring 516 or the like, cooperates with a groove 518 formed in stanchion tube 502. Stanchion tube bottom end cap 510 engages a ledge 520 that is formed in stanchion tube 502 and is offset from groove 518 such that bottom end cap 510 is positionally fixed with respect to stanchion tube 502 when snap ring 516 is engaged with groove 518.

A compression rod 530 extends longitudinally within stanchion tube 502. A first end 532 of compression rod 530 is sealingly attached to bottom end cap 510 of stanchion tube 502. A compression rod cap 534 is engaged with a second end 536 of compression rod 530 and prevents fluid communication between an interior volume 538 of stanchion tube 502 and an interior volume 540 of compression rod 530.

Piston rod 512 extends between a first end 550 that faces in a downward direction and is fixedly connected to a lower end 556 of slider tube 504 and a second end 552 that is opposite first end 550 and positioned within compression rod 530. A valve assembly 560 is attached to lower end 556 of slider tube 504 and selectively fluidly connects the chamber of piston rod 512 and compression rod 530 to atmosphere and/or a pressure or gas source. A piston assembly 566 is fixedly and sealingly attached to second end 552 of piston rod 512. Piston assembly 566 is slidably positioned within volume 540 of compression rod 530. Piston assembly 566 divides volume 540 of compression rod 530 into a first chamber 570 that forms a negative air spring and a second chamber 572 that forms a portion of a positive air spring of shock assembly 500.

A first side 574 of piston assembly 566 faces stanchion tube 510 and first chamber 570. A second side 576 of piston assembly 566 faces compression rod 534 and second chamber 557 of compression rod 530. Second chamber 572 of compression rod 530 is fluidly connected to a volume 580 of piston rod 512 via a passage 582 formed through piston assembly 566. Passage 582 includes a restriction, venturi, valve section, or orifice 584 that controls fluid communication between volume 580 of piston rod 512 and second portion 572 of the volume 540 of compression rod 530 during movement of piston assembly 566 relative to compression rod 530.

A bypass 588 is formed in an interior wall 590 of compression rod 530. Bypass 588 allows selective fluid communication between first chamber 570 and second chamber 572 of compression rod 530 when piston assembly 566 is generally aligned therewith. The position of bypass 588 along the longitudinal length of compression tube 530 generally defines the suspension performance of negative air spring chamber 570 of shock assembly 500.

A positive coil spring 600 is captured between stanchion tube bottom cap 510 and the bottom end of slider tube 504. Coil spring 600 is oriented generally radially outward with respect to piston rod 512 and radially inward with respect to stanchion tube 502 and slider tube 504 such that piston rod 512 provides a support that prevents lateral deflection of spring 600 during the compression stroke. Shock assembly 500 also includes a top out spring 606 that is captured between piston assembly 566 in stanchion tube bottom cap 510. Top out spring 606 contributes to the suspension performance of negative air chamber 570 so as to prevent direct interaction between piston assembly 566 and stanchion tube bottom cap 510.

As compared to shock assembly is 40 and 300, the downward facing end of each of piston rod 512 and compression rod 530 are independently supported relative to shock assembly 500. Further, valve assembly 560 of shock assembly 500 is oriented in a downward facing direction as compared to the upward facing orientation of valve assemblies 240 and 324 of shock assemblies 40 and 300.

During a compression stroke of shock assembly 500, stanchion tube 502 and slider tube 504 move toward one another such that piston assembly 566 translates within volume 540 of compression rod 530 toward a compression rod top cap 534. During such movement, volume 562 of piston rod 512 and volume 572 of compression rod 530 provide a positive air spring suspension feature that, concurrent with coil spring 600, resists such translation of stanchion tube 502 relative to slider tube 504. An equalization pressure between the volume associated with the positive air spring chamber 562, 572 and negative air spring chamber 570 is achieved as piston assembly 566 translates past bypass 588 in both the compression and the rebound directions. During the rebound or expansion stroke, as piston assembly 566 continues to translate in a downward direction towards stanchion tube bottom 510, the air contained in negative air spring chamber 570 resists continued translation of piston assembly 566 toward stanchion tube bottom cap 510 after piston assembly 566 translates past bypass 588 traveling in the downward direction. Top out spring 606 in negative air spring chamber 570 concurrently contributes to provide top out or protection from over extension of stanchion tube 502 relative to slider tube 504.

As alluded to above, the configuration of passage or orifice 584 can alter the suspension performance of any of shock assemblies 40, 300 or 500. FIGS. 11-13 show three exemplary embodiments of piston assemblies according to the present invention. It is envisioned that each of piston assemblies 176, 340 and 566 be replaceable and/or interchangeable and/or have an interchangeable orifice such that the performance of any of shock assemblies 40, 300, 500 can be altered by manipulation of the respective piston and/or the orifice associated therewith.

Referring to FIG. 11, a piston body 620 according to one embodiment of the invention includes a passage 622 that is formed therethrough. Piston body 620 includes an exterior facing groove 624 that is shaped to cooperate with a seal for allowing slidable sealed interaction between the piston assembly and a respective compression rod. Piston body 620 includes a threaded portion 626 that remotely cooperates with the corresponding piston rod. A seal groove 628 is formed about threaded portion 626 to provide sealed interaction between piston body 620 and a piston rod attached thereto. Understandably, any number of sealed engagements could be provided. Depending on the orientation of the piston with respect to the corresponding piston rod and compression rod, piston body 620 includes a first side 630 that faces toward a negative air spring chamber and a second side 634 that faces toward a positive air spring chamber.

An orifice section or simple an orifice 640 is formed in passage 622 and manipulates the flow between the positive air spring chamber volumes associated with a corresponding piston rod and the corresponding compression rod. In one preferred embodiment, orifice 640 of piston body 620 has a bore of approximately 0.098 inches or 2.5 mm. As will be described further below with respect to FIGS. 14 and 15, altering the configuration of orifice 640 manipulates the suspension performance of the underlying shock assembly.

FIG. 12 shows a piston body 650 according to another embodiment of the invention. As the construction of piston body 650 is generally similar to the construction of piston body 620, like reference numerals have been used and correspond to the description thereof. Piston body 650 includes an orifice 656 that has a substantially smaller cross-sectional area than orifice 640. As shown in FIG. 12, in one embodiment, the shock assemblies of the present invention are provided with a piston orifice 656 having a cross-sectional area of approximately 0.039 inches or 1 mm.

FIG. 13 shows a piston body 660 according to another embodiment of the invention. Piston body 660 is generally similar to piston bodies 620 and 650 with respect to the exterior construction thereof and the interaction of the piston body with the corresponding piston rod and compression rod. However, rather than replacing the entirety of the piston body to alter the suspension performance of the shock assembly equipped therewith, piston body 660 includes in interchangeable restriction insert 662 that threadingly cooperates with piston body 660. It is envisioned that restriction insert 662 be provided in a number of configurations having orifices 664 with different cross-sectional values. It is envisioned that insert 662 further include one or more detents or recesses adapted to cooperate with common mechanical drivers such as screwdrivers Allen wrenches and/or spanner wrenches so as to allow the removal of insert 662 from piston body 660 in a fairly conventional manner.

Figure 14:
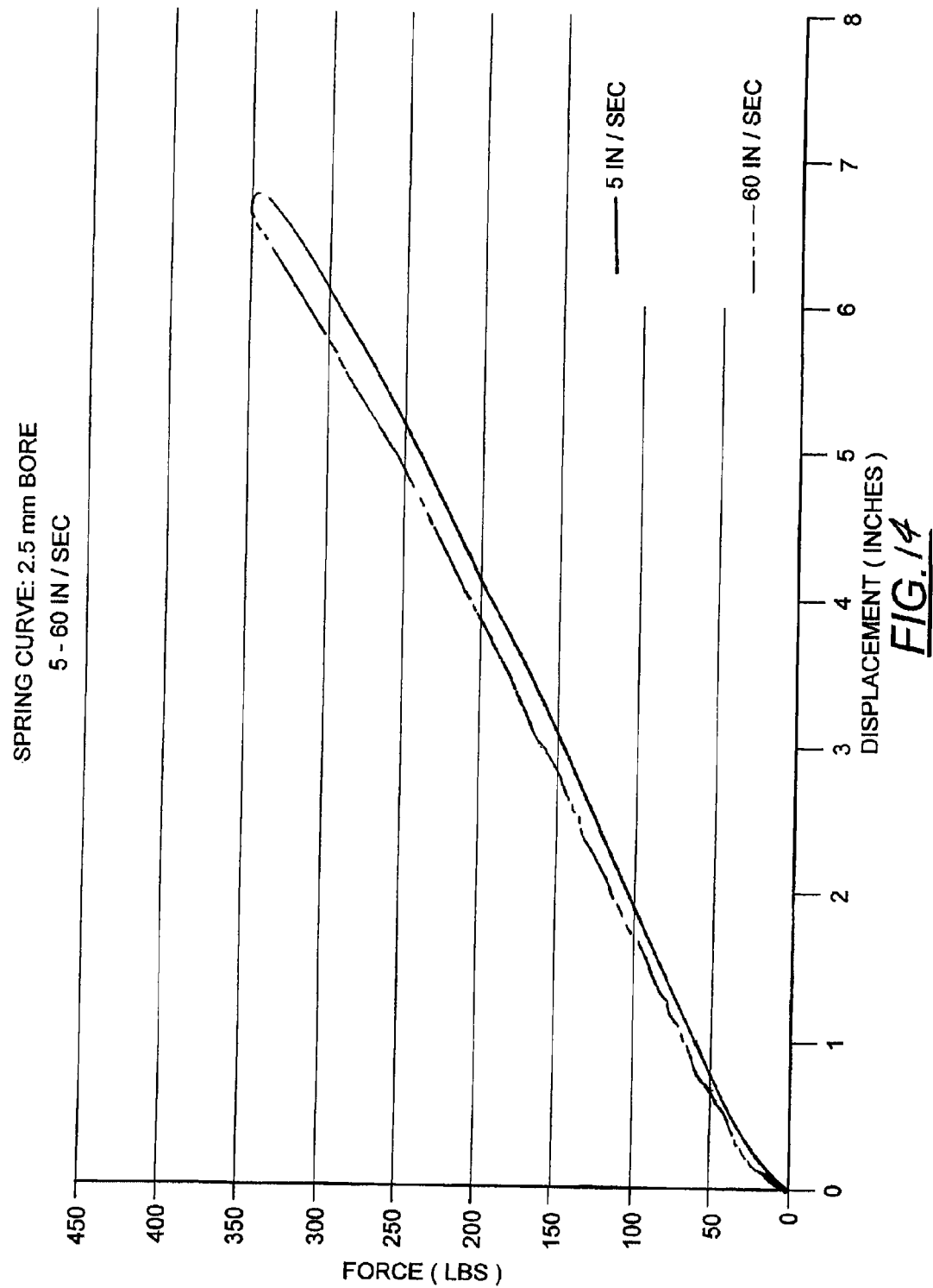
FIGS. 14-15 are graphical representations of different operating characteristics that can be achieved with the various piston configurations shown in FIGS. 11-13.
Figure 15:
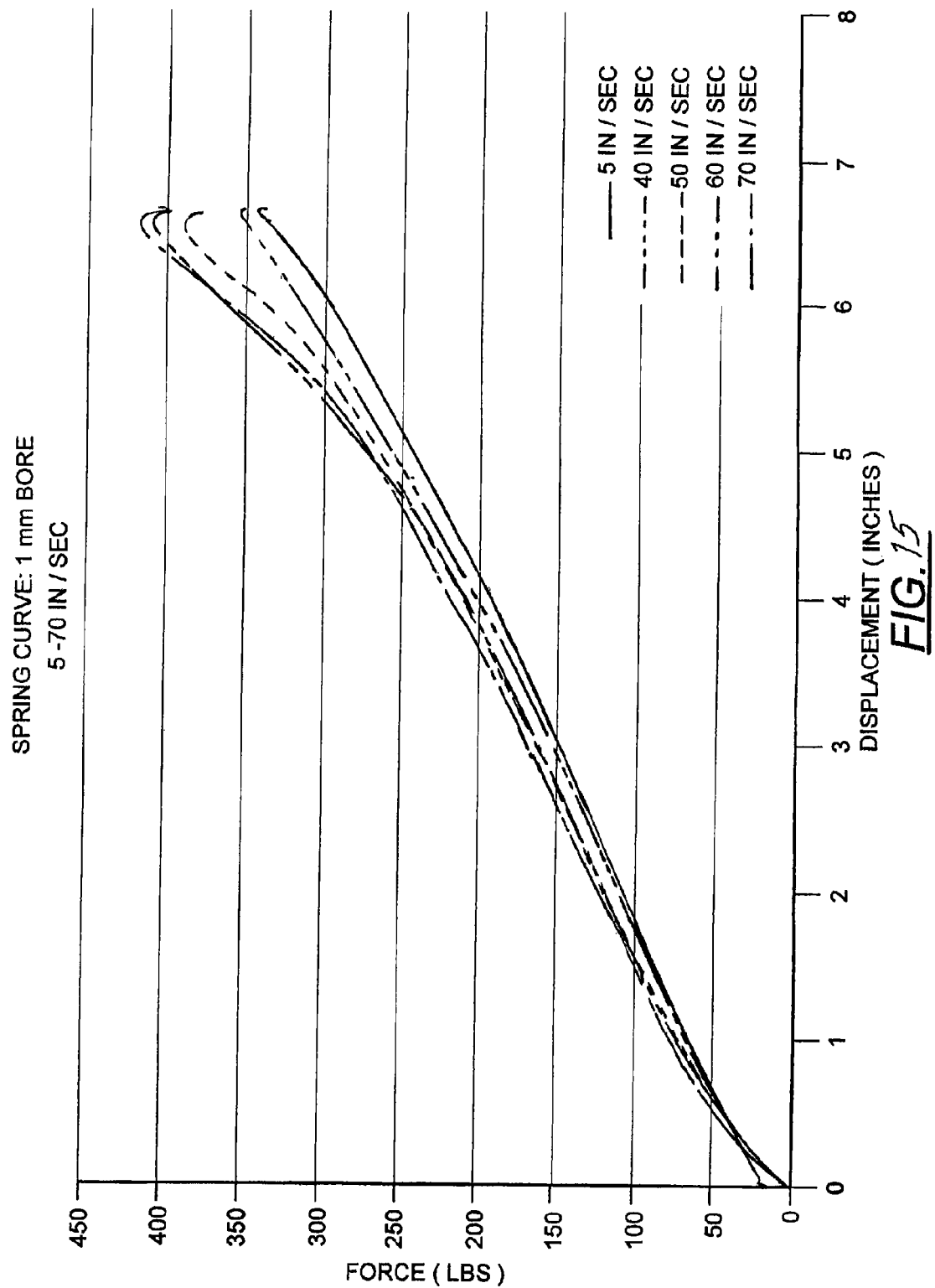

FIGS. 14 and 15 showed exemplary output ranges that can be achieved with any of shock assemblies 40, 300 or 500 as a function of changes to the size of the orifice associated with the piston thereof. As shown in FIG. 14, shock assemblies 40, 300, 500 having piston assemblies with a 0.098 inches or 2.5 mm bore provide displacements that approximate 7 inches when subjected to gradual lowering input rates up to forces of approximately 350 pounds. As the rate of the displacement was increased from 5 inches per second to 60 inches per second, the spring curve associated with the fluid flow through the 2.5 millimeter bore maintained a generally linear relation but with a slightly greater slope at 60 inch per second inputs as compared to 5 inch per second inputs. Testing at a number of additional inputs between 5 inches per second and 60 inches per second indicates that the spring curve generally maintains a fairly gradual progression between the spring curve trends associated with the 5 inch per second inputs and 60 inch per second inputs.

Comparatively, FIG. 15 shows various spring curves that can be achieved with any of shock assemblies 40, 300, 501 when the shock assemblies are provided with a piston having an orifice such as that shown in FIG. 12 with an approximately 0.039 inch or 1 mm bore. As shown in FIG. 15, piston assemblies having a 1 mm restriction or orifice generate spring curves that gradually increase from a 5 inch per second input to a 70 inch per second input. As shown in FIG. 15, the 1 mm bore of the restriction allows the shock assembly to withstand greater loads as the rate of input increases as compared to shocks having larger orifice openings. The 1 mm bore also allows the shock assembly to withstand greater loads at greater input rates as compared to the shock assembly equipped with the 2.5 millimeter bore as represented in FIG. 14. Accordingly, manipulation of the size of the orifice associated with the corresponding piston assembly allows manipulation and/or tuning of the speed sensitivity of the suspension assembly to a variety of user preferences.

Figure 16:
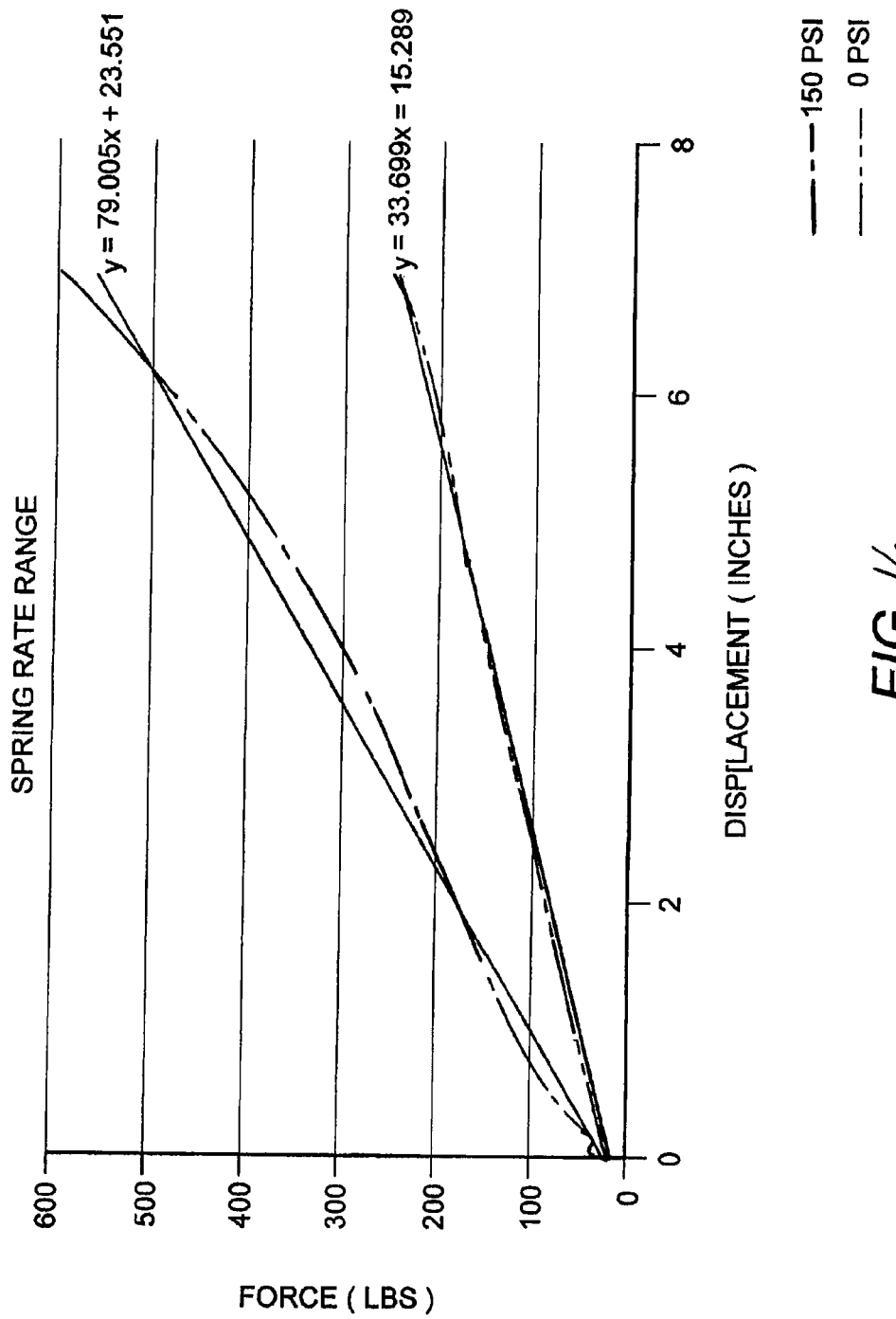
FIG. 16 is a graphical representation of spring rates that can be achieved with any of the shock assemblies shown in FIGS. 4-9.

In addition to tuning of the suspension performance of any of shock assemblies 40, 300, 500 via manipulation of the size of an orifice associated with the piston assembly as discussed above, it is further appreciated that the suspension performance of any of shock assemblies 40, 300, 500 can be conveniently manipulated by altering the initial and/or at rest pressurization of the respective shock assembly. As shown in FIG. 16, any of shock assemblies 40, 300, 500 can be configured to provide approximately 250 pounds to 550 pounds of displacement resistance by manipulating the at rest pressurization of the shock assembly from between 0 psi to approximately 150 psi. It should be understood that at an initialization pressure of 0 psi, a substantial portion of the spring rate of shock assemblies 40, 300, 500 is provided by the positive coil spring enclosed in the shock assembly. As the at rest pressure of the shock is increased, the positive air spring can contribute up to, or more than, 50% of the overall suspension performance spring curve. It is further appreciated that the suspension performance of each of shock assemblies 40, 300, 500 could further be adjusted by fluidly manipulating the volume associated with performance of the air spring chambers. That is, an amount of oil less than the total volume of the air spring chamber could be added to any of shock assemblies 40, 300, 500 so as to alter the volume of air and thereby the fluid performance of the corresponding shock assembly. Such manipulations provide highly adjustable or tunable shock assemblies that can be configured to provide virtually infinite spring rate ranges between 0 psi and a maximum operating pressure of the shock assembly.

Therefore, a bicycle shock absorber assembly according to one embodiment includes a stanchion tube and a slider tube that telescopically cooperates with the stanchion tube. The shock assembly includes a piston rod that extends longitudinally within the volume enclosed by the stanchion tube and the slider tube. A compression rod extends longitudinally within the volume that is enclosed by the stanchion tube and the slider tube. The piston rod and the compression rod telescopically cooperate with one another. A piston is supported by the piston rod and is positioned within the compression rod. A negative air spring is formed by a volume that is enclosed by a first side of the piston, an interior surface of the compression rod, and an exterior surface of the piston rod. The shock assembly includes a positive air spring that is formed by another volume enclosed by a second side of the piston, another portion of the interior surface of the compression rod, and an interior surface of the piston rod.

Another embodiment of the invention combinable with one or more aspects of the above embodiment includes a bicycle air shock having an outer casing that includes a head tube that telescopically cooperates with a leg tube. The shock includes a piston rod that has a hollow core and which extends longitudinally within the outer casing. A compression rod having a hollow core is telescopically associated with the piston rod. A coil spring extends longitudinally within the outer casing and is positioned radially outward with respect to a radius of the piston rod. A piston that is attached to the piston rod is slidably positioned within the hollow core of the compression rod so that the piston divides the hollow core of the compression rod into a negative air spring chamber and a positive air spring chamber wherein the positive air spring chamber is fluidly connected to the hollow core of the piston rod.

Another embodiment of the invention that is combinable with one or more of the aspects of the above embodiments includes a method of controlling motion of a bicycle shock assembly. The method includes telescopically associating a hollow piston rod with a hollow compression rod. The piston rod and the compression rod are enclosed within a stanchion tube and a slider tube that are telescopically associated with respect to one another. A volume of the compression rod is divided into a first chamber and a second chamber with a piston that 1) is attached to the piston rod, 2) is moveable within the compression rod, and 3) sealingly cooperates with an interior wall of the compression rod. A positive air spring chamber is formed by fluidly connecting a volume of the piston rod to the second chamber of the compression rod with an orifice that is formed in the piston. A coil spring is positioned between the piston rod and one of the stanchion tube and the slider tube so that the coil spring and the positive air spring chamber concurrently contribute to resist shorting of the shock assembly.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto. That is, as described in the forth coming claims, the invention includes all of the embodiments as well as aspects specific thereto.

What is claimed is:

1. A shock absorber assembly comprising:
  a compression tube associated with a first mounting point;
  a piston including a piston rod wherein the piston is positioned within the compression tube and the piston rod is associated with a second mounting point,
    wherein the piston rod includes a first portion and a second portion and the second portion of the piston rod is configured to translate with respect to the first portion of the piston rod;
  a negative air spring volume defined at least by a first side of the piston, an interior surface of a first portion the compression rod, and an exterior surface of a portion of the piston rod; and
  a positive air spring volume including:
    a first chamber defined at least by a second side of the piston, and a second portion of the interior surface of the compression tube; and
    a second chamber located in the piston rod;
  wherein the positive air spring volume is fluidly isolated from the negative air spring over a majority of a translation range of the piston in the compression tube.

2. The shock absorber assembly of claim 1, further comprising:
  a stanchion tube mechanically coupled to the piston rod; and
  a slider tube mechanically coupled to the compression tube;
  wherein the slider tube is configured to cooperate telescopically with the stanchion tube.

3. The shock absorber assembly of claim 2, further comprising a primary coil spring that is located between the stanchion tube and the compression rod.

4. The shock absorber assembly of claim 1, wherein:
  the piston further comprises a restriction configured to restrict the fluid communication between a first volume in the piston tube and a second volume associated with the second portion of the interior surface of the compression.

5. The shock absorber assembly of claim 1, wherein the first portion of the piston rod is configured to be interchangeable and the second portion of the piston rod is configured to be interchangeable to alter the spring performance of the shock absorber assembly.

6. The shock absorber assembly of claim 1, further comprising a bypass located in the interior surface of the compression tube.

7. The shock absorber assembly of claim 1, wherein a translation of the piston in the compression tube is associated with:
  a first translation range where the first gas spring volume is isolated from the second gas spring volume;
  a second translation range where the first gas spring volume is fluidly coupled to the second gas spring volume; and
  a third translation range where the first gas spring volume is isolated from the second gas spring volume.

8. The shock absorber assembly of claim 1, further comprising a valve assembly configured to allow pressurization of the positive air spring volume; and wherein the second translation range is associated with an unsprung fill position such that, when the positive air spring volume is pressurized, the negative air spring volume is also pressurized.

9. An apparatus comprising:
  a shock including:
    a cylinder associated with a first mounting point of the shock, wherein the cylinder comprises a coupler; and
    a piston associated with a second mounting point of the shock, wherein the piston is located in the cylinder;
  wherein:
    the piston divides the cylinder into a first gas spring volume and a second gas spring volume;
    the first gas spring volume is isolated from the second gas spring volume while the piston is translating in a first range of the cylinder; and
    the coupler fluidly couples the first gas spring volume and the second gas spring volume while the piston is translating in a second range of the cylinder.

10. The apparatus of claim 9, wherein the first gas spring volume is isolated from the second gas spring volume while the piston is translating in a third range of the cylinder.

11. The apparatus of claim 10, wherein:
  the coupler is located in the second gas spring volume while the piston is translating in the first range of the cylinder;
  the coupler is located in the first gas spring volume and the second gas spring volume while the piston is translating in the second range of the cylinder; and
  the coupler is located in the first gas spring volume while the piston is translating in the third range of the cylinder.

12. The apparatus of claim 11, further comprising a spring mounted between the first mounting point of the shock and the second mounting point of the shock.

13. The apparatus of claim 11, wherein the piston is linked to the second mounting point of the shock at least in part by a piston rod.

14. The apparatus of claim 11, further comprising a valve configured for pressurizing the first gas spring volume, wherein the first mounting point comprises a fork end and the second mounting point comprises a fork crown.

15. An apparatus comprising:
   a cylinder associated with a first mounting point; and
   a piston including a piston tube associated with a second mounting point;
   wherein:
      the piston is located in the cylinder;
      the piston divides the cylinder into a first gas spring volume and a second gas spring volume; and
      the piston tube is hollow defining a piston tube volume;
      the first gas spring volume includes the piston tube volume of the piston tube;
      the first gas spring volume and the second gas spring volume are fluidly isolated over a first predetermined translation range of the piston in the cylinder; and
      the first gas spring volume and the second gas spring volume are fluidly coupled over a second predetermined translation range of the piston in the cylinder.

16. The apparatus of claim 15, further comprising a main spring mechanically coupled between the first mounting point and the second mounting point.

17. The apparatus of claim 15, wherein the first mounting point comprises a fork end and the second mounting point comprises a fork crown.

18. The apparatus of claim 15, wherein the piston further comprises a restriction configured to restrict a fluid coupling of the piston tube volume to a remainder of the first gas spring volume.

19. The apparatus of claim 15, further comprising a valve configured for pressurizing the first gas spring volume.

* * * * *